No. 852,849.　　　　　　　　　　　　　　　　　　　PATENTED MAY 7, 1907.
A. O. SCHMOLINSKI.
FARE REGISTER.
APPLICATION FILED MAY 31, 1906.

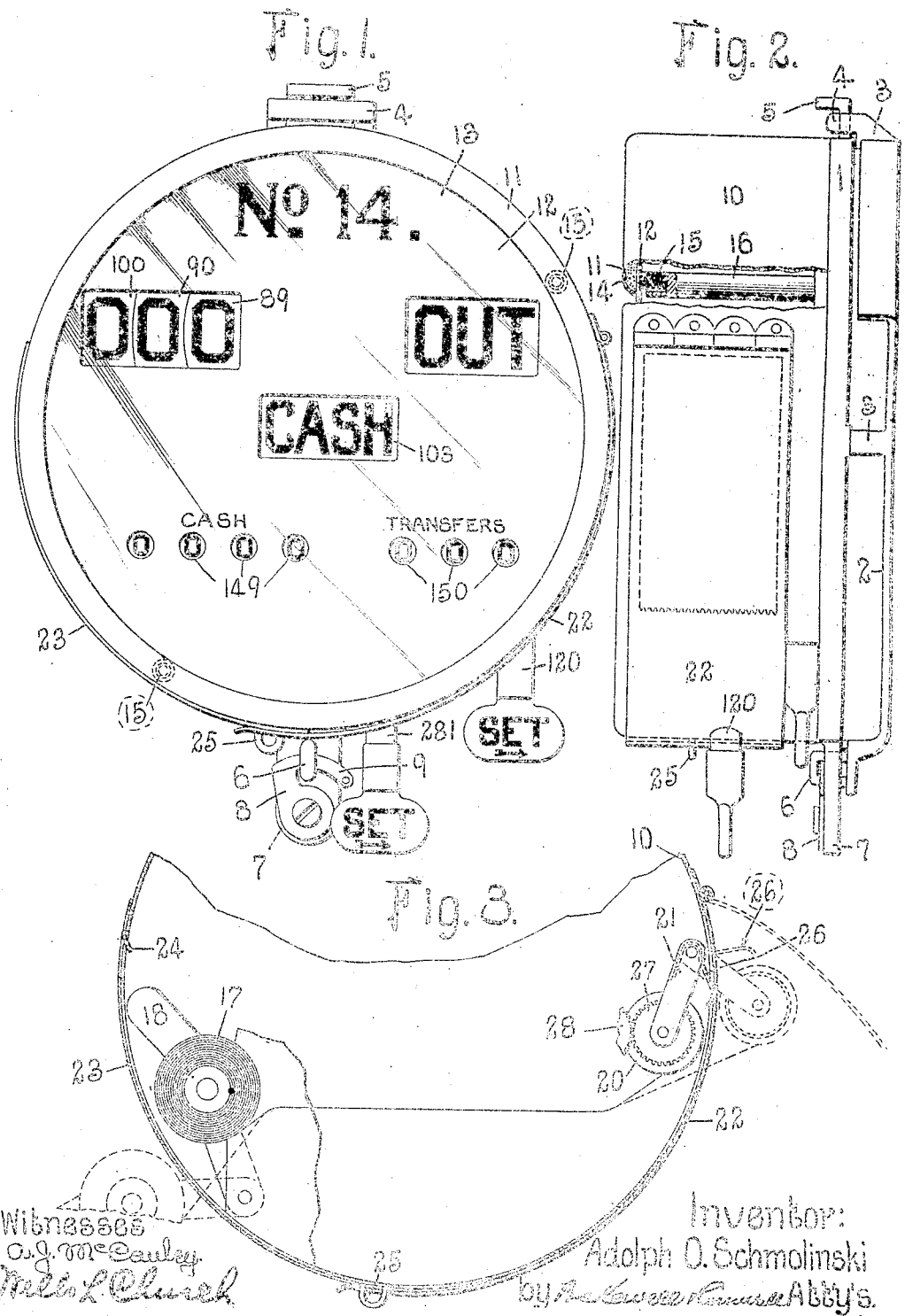

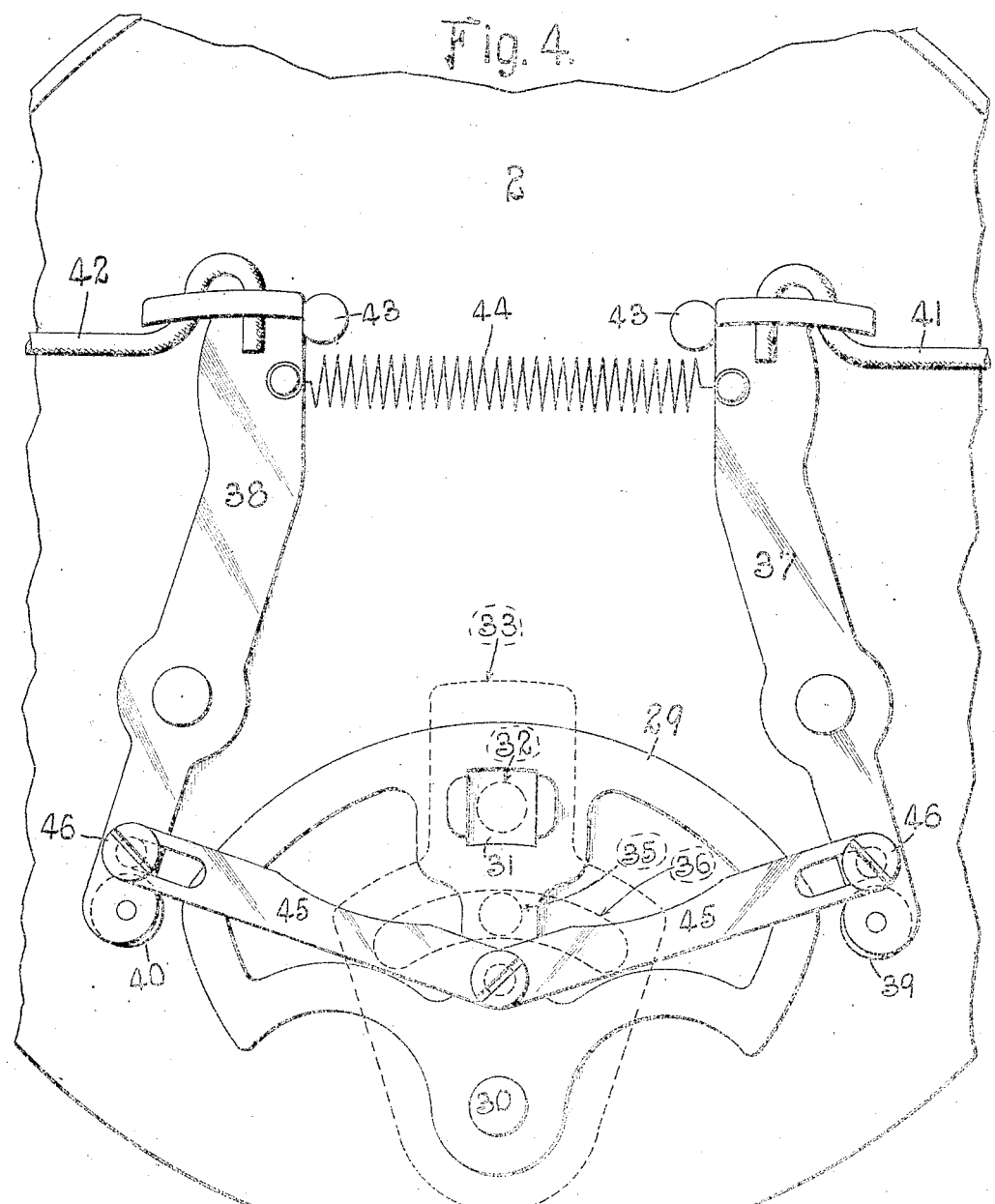

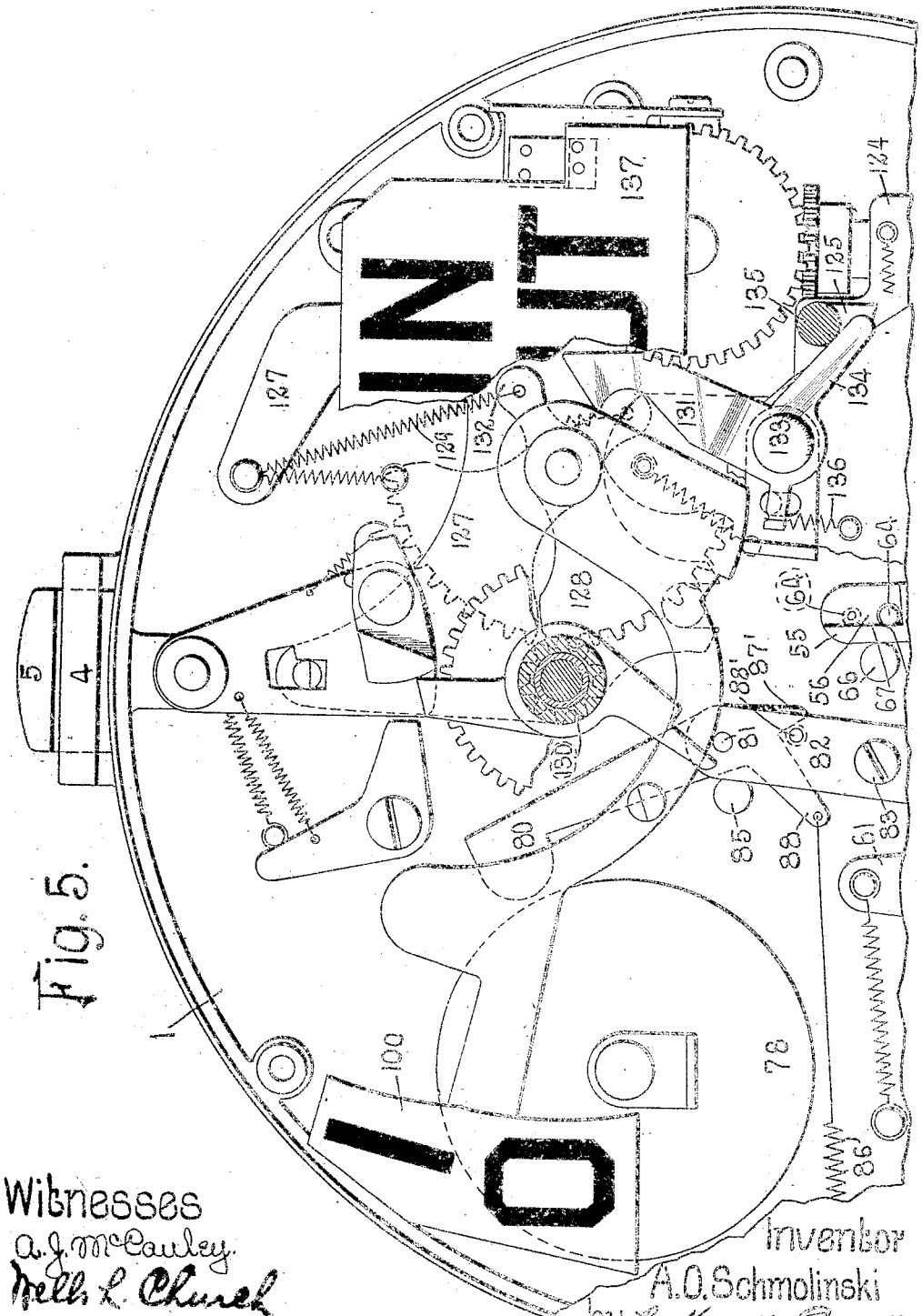

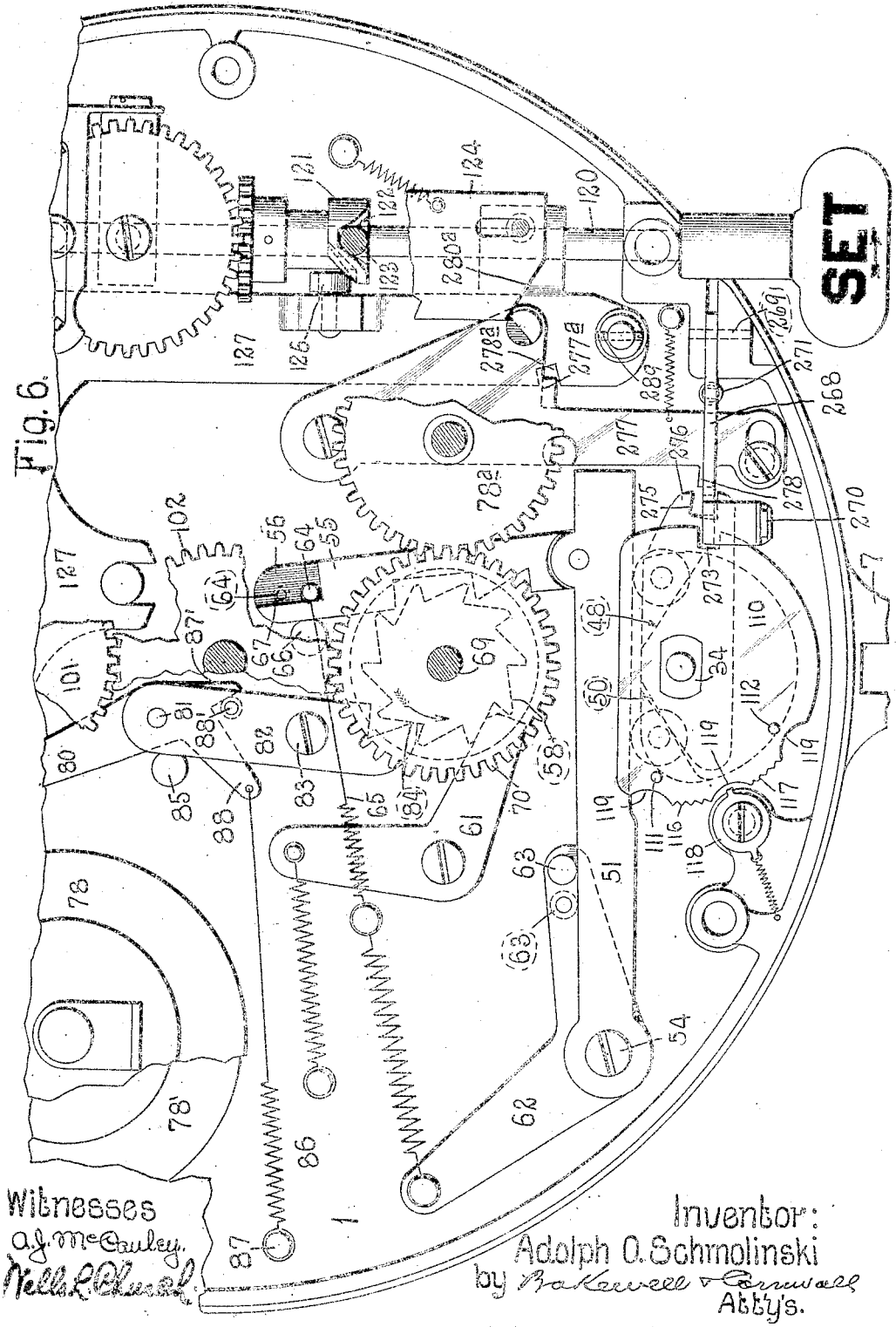

11 SHEETS—SHEET 5.

Witnesses
a.g. McCauley

Inventor:
A.O. Schmolinski
BY
Bakewell Cornwell
ATT'YS.

No. 852,849. PATENTED MAY 7, 1907.
A. O. SCHMOLINSKI.
FARE REGISTER.
APPLICATION FILED MAY 31, 1906.
11 SHEETS—SHEET 6.
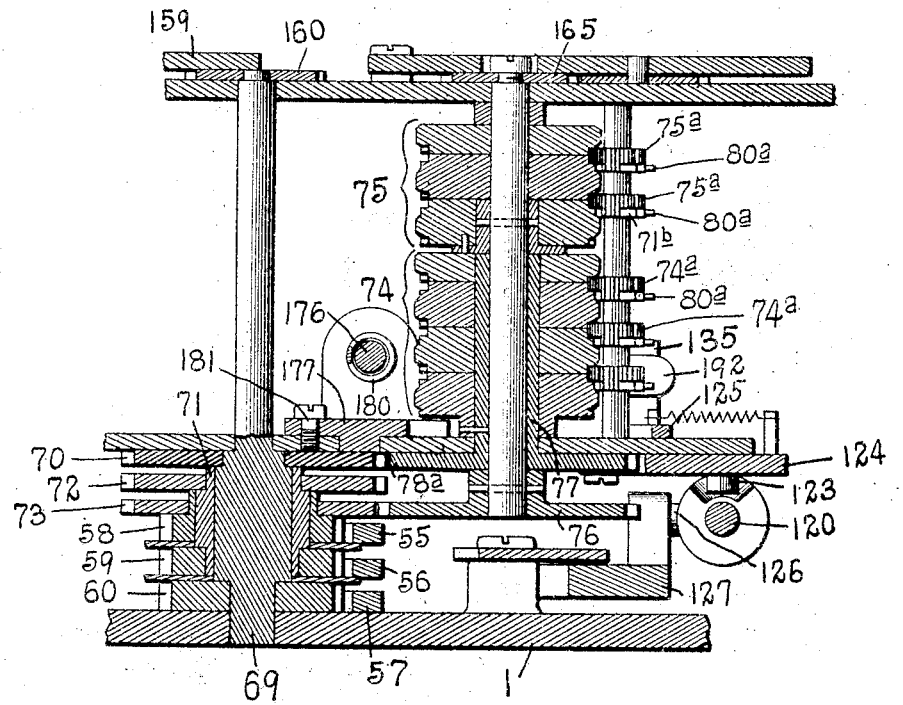
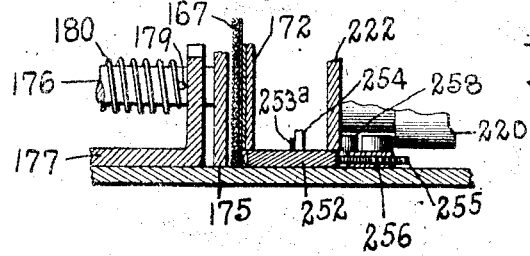
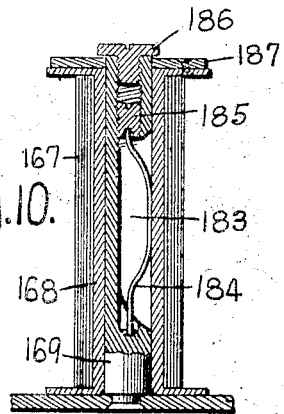
Witnesses
A. J. McCauley
Nells L. Church
Inventor:
Adolph O. Schmolinski
by Bakewell Cornwall
Atty's.

No. 852,849. PATENTED MAY 7, 1907.
A. O. SCHMOLINSKI.
FARE REGISTER.
APPLICATION FILED MAY 31, 1906.
11 SHEETS—SHEET 7.
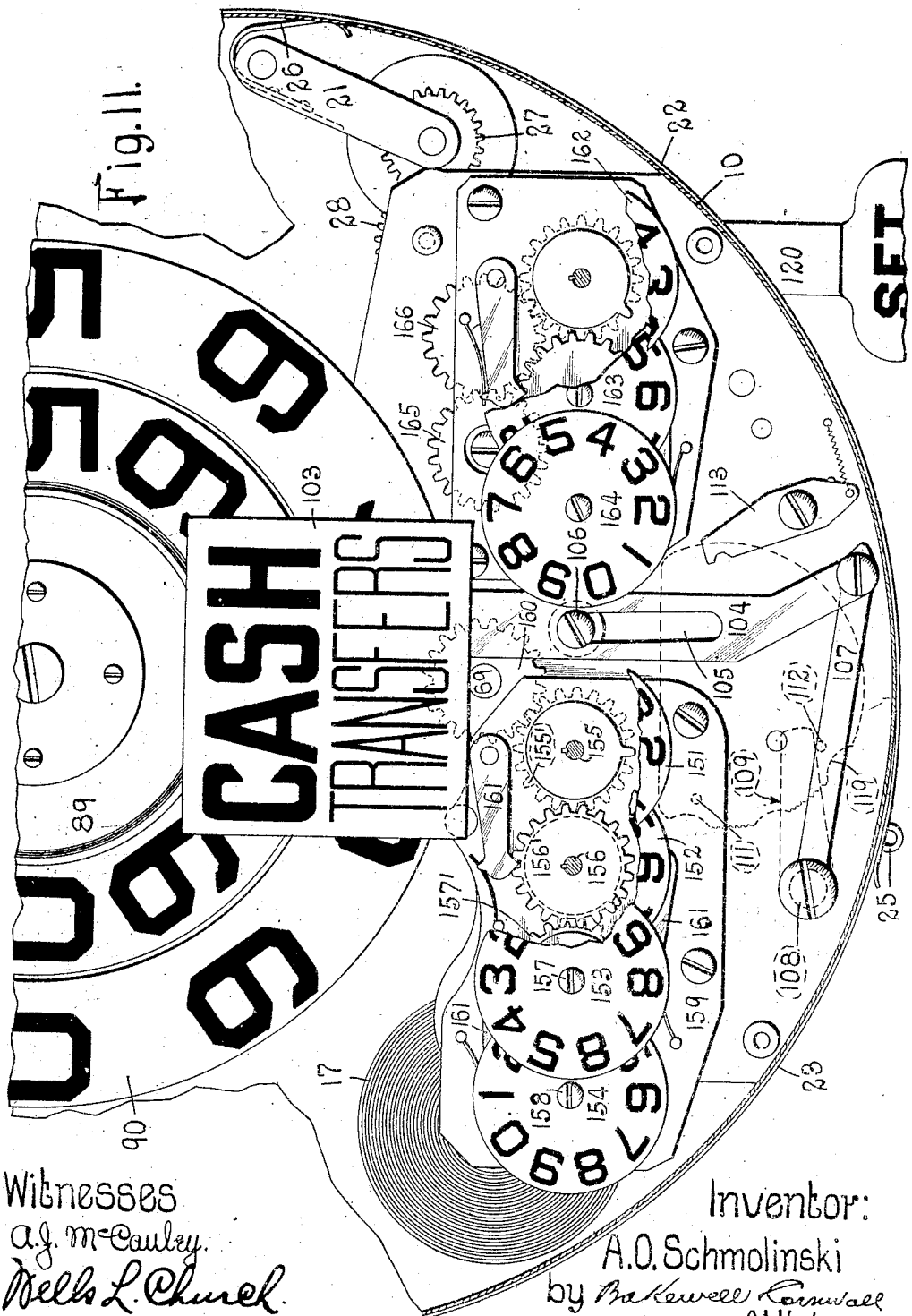
Witnesses
A. J. McCauley.
Wells L. Church.
Inventor:
A. O. Schmolinski
by Bakewell Cornwall
Att'y's.

No. 852,849. PATENTED MAY 7, 1907.
A. O. SCHMOLINSKI.
FARE REGISTER.
APPLICATION FILED MAY 31, 1906.

11 SHEETS—SHEET 3.

Witnesses
a.J. McCauley
Nells L. Church

Inventor:
Adolph O. Schmolinski
by Bakewell Cornwall Att'ys.

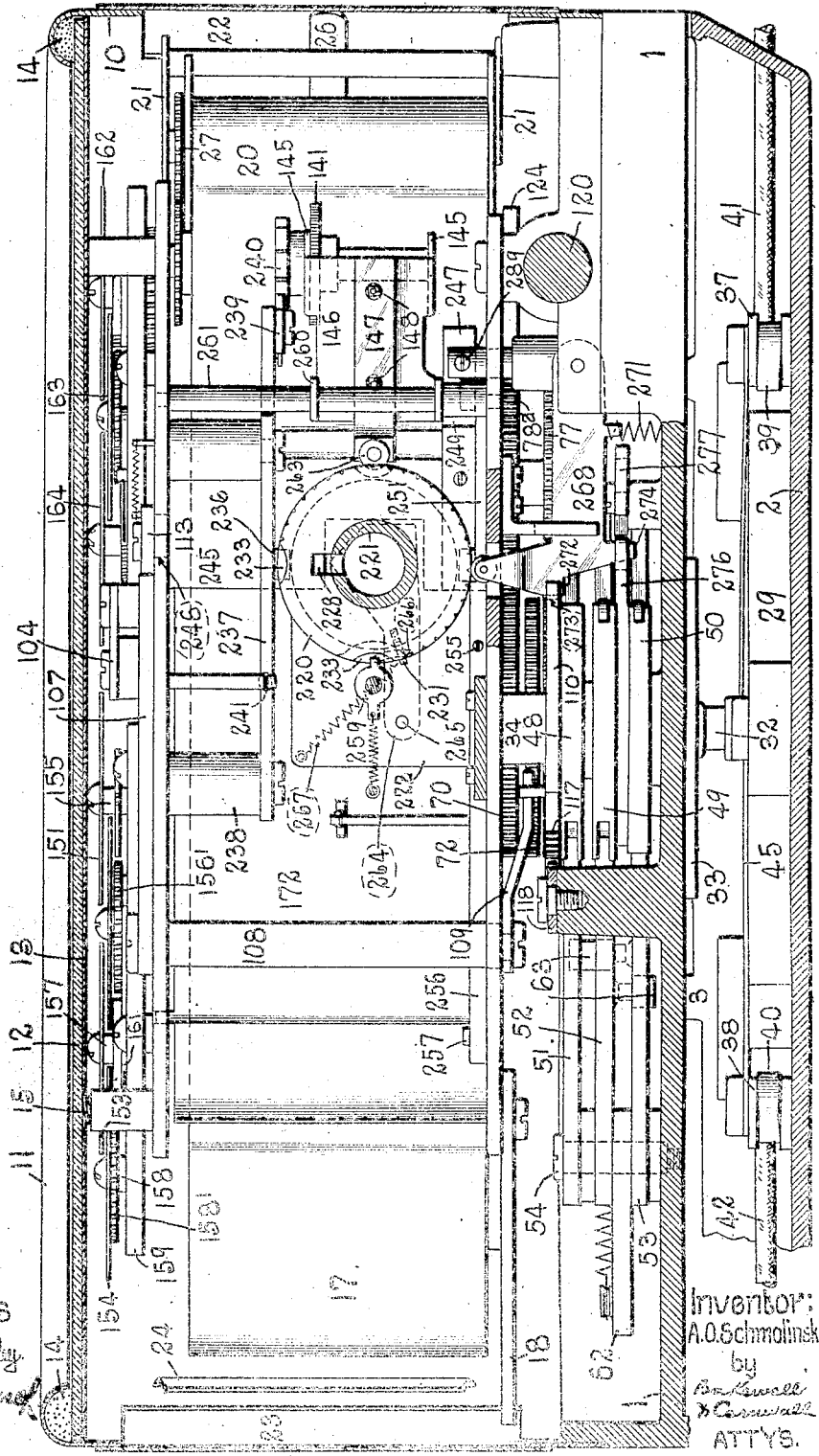

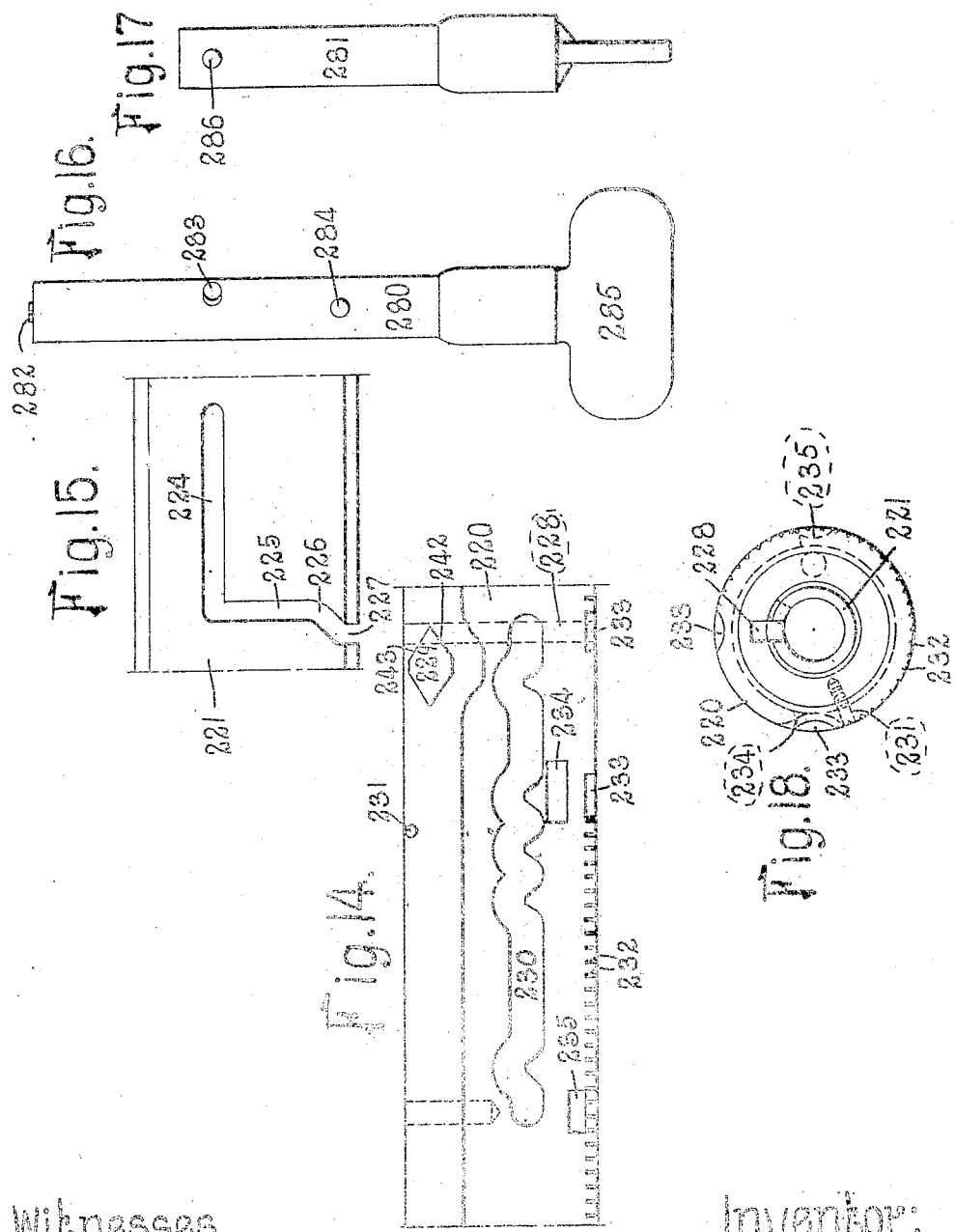

No. 852,849. PATENTED MAY 7, 1907.
A. O. SCHMOLINSKI.
FARE REGISTER.
APPLICATION FILED MAY 31, 1906.

11 SHEETS—SHEET 11.

Witnesses
A. J. McCauley
Nells L. Church

Inventor:
Adolph O. Schmolinski
by Bakewell Cornwall
Atty's.

UNITED STATES PATENT OFFICE.

ADOLPH O. SCHMOLINSKI, OF ST. LOUIS, MISSOURI, ASSIGNOR TO SECURITY REGISTER COMPANY, OF ST. LOUIS, MISSOURI, A CORPORATION OF MISSOURI.

FARE-REGISTER.

No. 852,840.

Specification of Letters Patent.

Patented May 7, 1907.

Application filed May 31, 1906. Serial No. 319,616.

*To all whom it may concern:*

Be it known that I, ADOLPH O. SCHMOLINSKI, a citizen of the United States, residing at St. Louis, Missouri, have invented a certain new and useful Improvement in Fare-Registers, of which the following is a full, clear, and exact description, such as will enable others skilled in the art to which it appertains to make and use the same, reference being had to the accompanying drawings, forming part of this specification, in which—

Figure 7:
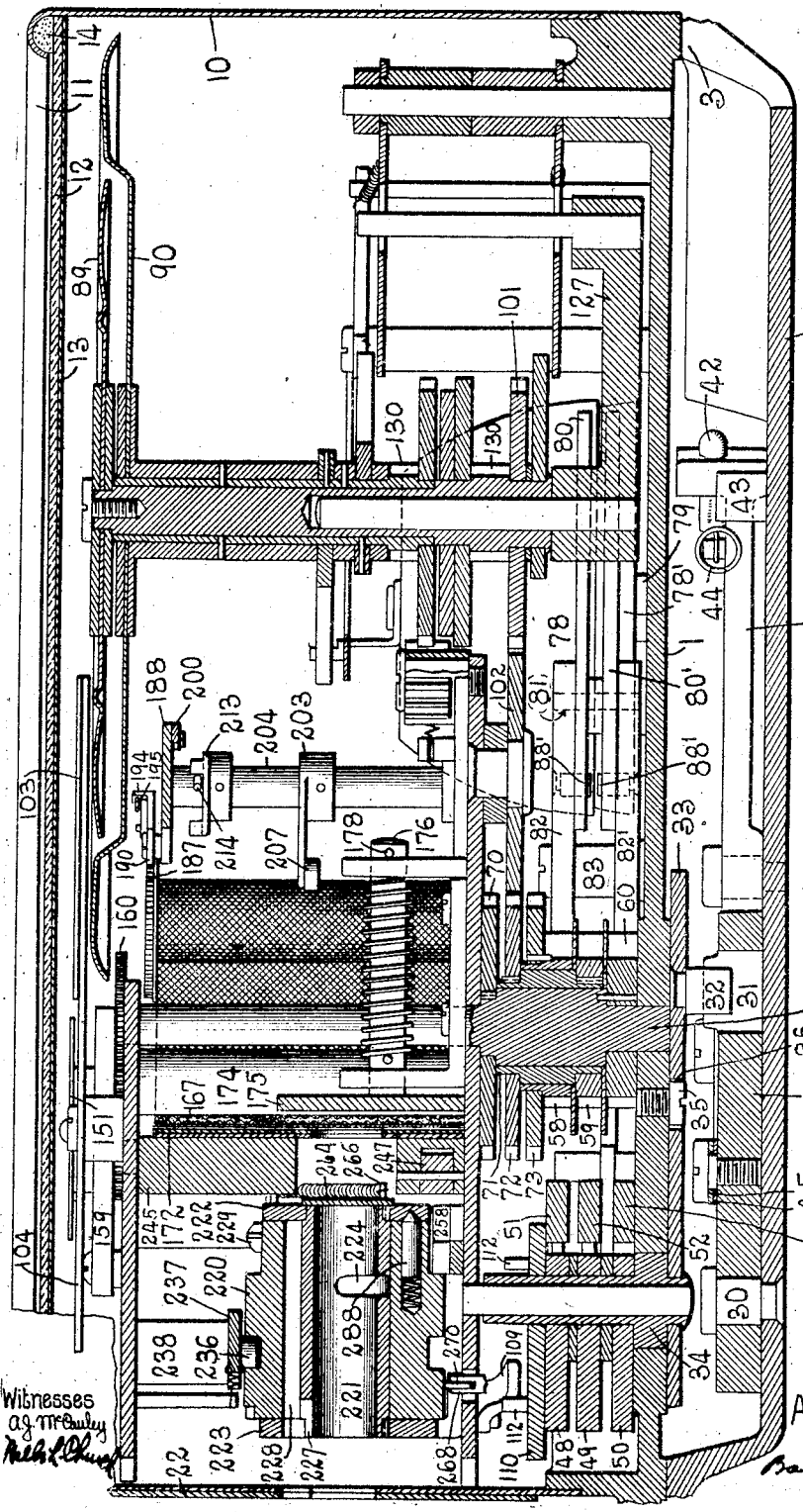
Figure 12:
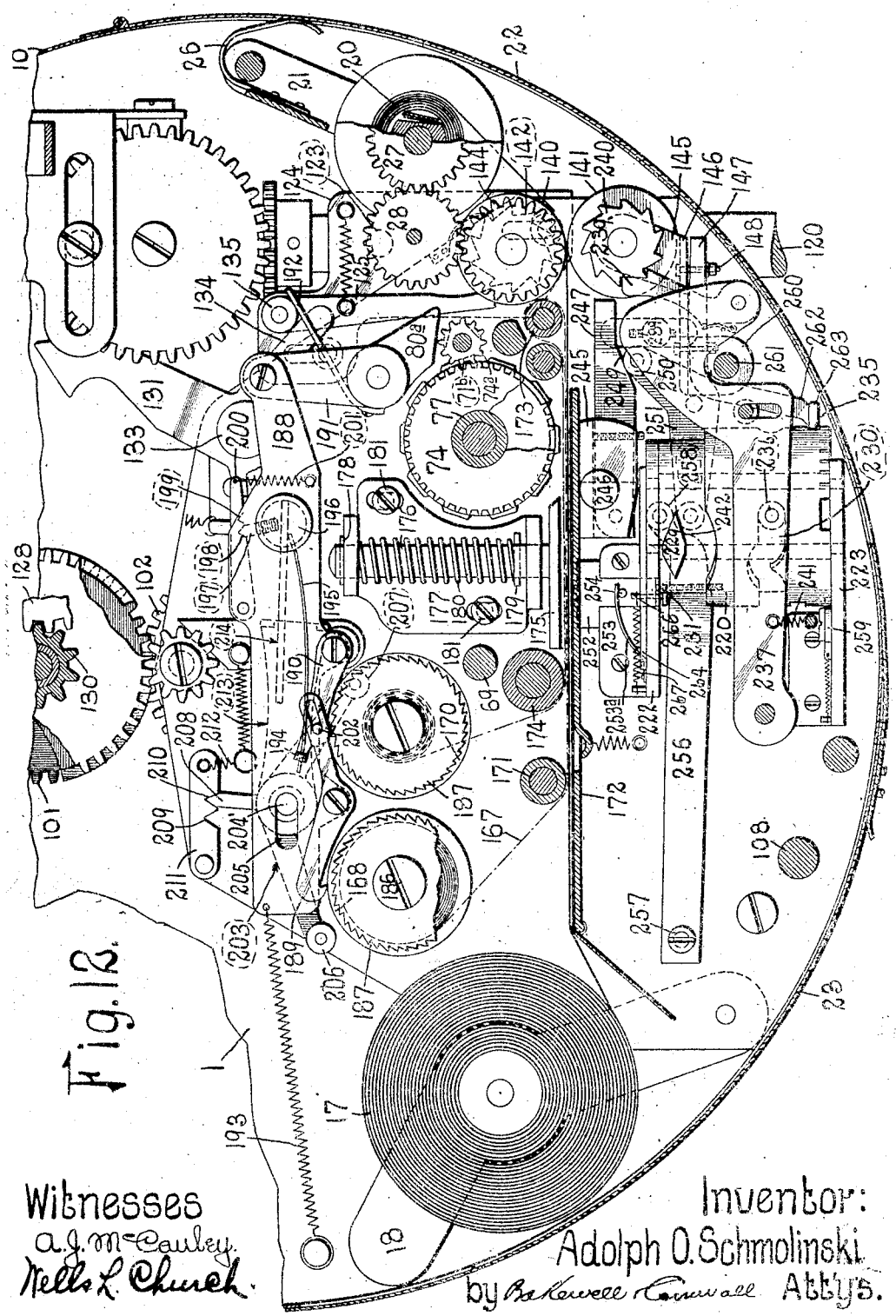
Figure 19:
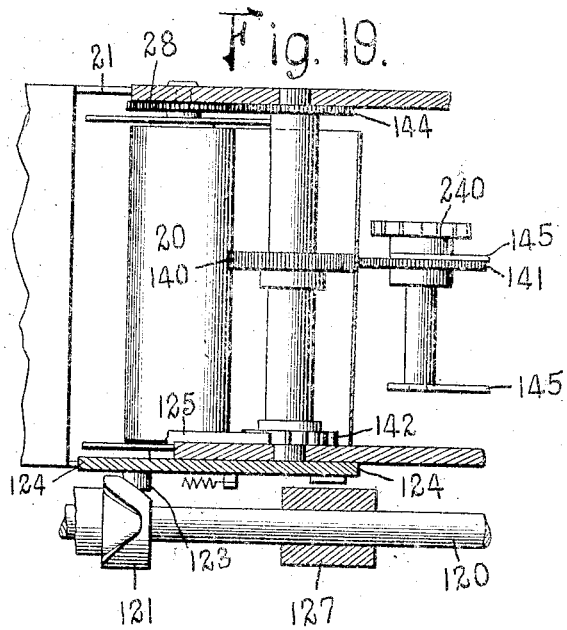
Figure 20:
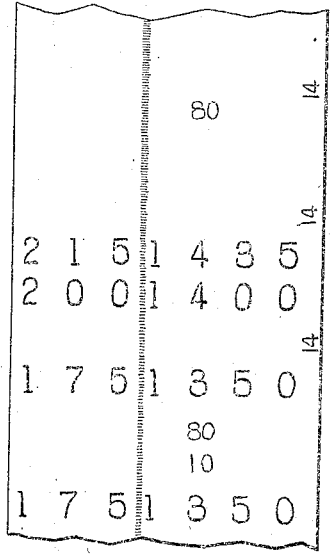

Figure 1 is a front elevation of a fare register embodying the features of my invention showing the position it occupies when placed in a car; Fig. 2 is a side elevation of the register shown in Fig. 1, a portion of the outer casing being broken away; Fig. 3 is a detail sectional view to show the rolls on which the strip of paper is wound; Fig. 4 is an enlarged detail view of the primary actuating mechanism of the register; Fig. 5 is an enlarged detail elevation of the upper portion of the register with the face plate and some of the other parts removed; Fig. 6 is a view similar to Fig. 5, of the lower portion of the register; Fig. 7 is a sectional view taken through approximately the center of the register; Fig. 8 is a transverse sectional view of the totalizers which are provided with type for causing the condition of the register to be printed on the strip of paper; Fig. 9 is a detail sectional view showing the stamp which prints the number of the register on the strip of paper; Fig. 10 is a detail sectional view of one of the spools on which the inking ribbon is wound; Fig. 11 is a front elevation of the lower portion of the register with only the face plate removed; Fig. 12 is a front elevation of the lower portion of the register with the face plate and other parts removed to show principally the construction of the mechanism which comprises the printing apparatus; Fig. 13 is a bottom plan view with the casing cut away and some of the parts in section; Fig. 14 is a development of the cylindrical device which is actuated by the operating handle; Fig. 15 is a development of the hollow shaft on which said cylindrical device is mounted; Figs. 16 and 17 show respectively, the conductor's stamp and the operating handle; Fig. 18 is an end view of the hollow shaft and the cylindrical device assembled; Fig. 19 is a detail view partly in section showing the paper feeding rolls; and Fig. 20 shows a portion of the strip of paper which has been fed through the machine register printed thereon.

This invention relates to fare registers, and particularly to those which are adapted for use in street cars to register different classes of fares such as cash fares and transfers.

One object of my invention is to produce a fare register which is so constructed that the conductor or motorman, who assumes charge of the car in which the register is located, or an inspector or officer of the road who gets on said car, can impress or print his number or designating mark on a strip of paper arranged inside of the register and thereafter cause the register to become operative by inserting an operating handle therein. This operating handle is separate and distinct from the individual stamp which the conductor or other employee inserts to print his number or mark on the strip, and means is provided for printing on the strip of paper the condition of the register at the time the operating handle is inserted and also the condition at the time the operating handle is removed. Preferably, means is also provided for printing the number of the register on the strip of paper at the time the operating handle is inserted.

Another object of my invention is to provide a fare register which will be inoperative and incapable of registering fares when the operating handle is not in position.

Other desirable features of my invention will be hereinafter pointed out.

The machine herein shown which represents the preferred form of my invention is a machine of the type shown in United States Patent No. 633,471, to W. G. Kirchhoff, Oct. 1, 1901, and many of the elements of my improved machine are shown and described in said patent to which reference may be had for a more detailed description of parts not herein specifically described.

Referring to the drawings which represent the preferred form of my invention, 1 designates the base plate of the machine which is of circular shape and carries most of the operating mechanism and 2 designates the back plate which is spaced away from the base plate to provide a space in which is mounted the primary actuating mechanism of the machine, the back plate being spaced away from the base plate by means of lugs 3. The base plate and back plate are removably connected together, the back plate being provided at its upper end with a yoke or strap 4 which engages an inverted L-shaped projection 5 carried by the base plate and the lower portion of the back plate carrying a staple 6 which projects through a hasp 7 on the base plate, thereby enabling said parts to be locked together by a padlock. Preferably, a dog 8 is pivoted to the hasp 7 and said dog is provided with an arm 9 which extends through the staple and is provided at its outer end with an opening in which the padlock is inserted. A cylindrical casing 10 is connected to the base plate and is provided with a flange 11 that holds in position the protecting glass 12 for the face plate 13. Said flange which is of substantially concave shape in cross section, as shown in Fig. 2, carries some yielding or fibrous material 14 with which the glass 12 contacts and the glass is held in engagement with said material by means of springs 15 mounted in recesses in posts 16 that are carried by the base plate whereby the protecting glass is prevented from rattling.

As shown in Fig. 3, a roll of paper 17 is provided, upon which the condition of the register is printed from time to time, and said roll is carried by a pivotally mounted arm 18 at one side of the machine, a rewinding roll 20 upon which the strip of paper is wound as it is fed through the machine being carried by pivotally mounted arms 21 at the other side of the machine. The cylindrical casing has a hinged door 22 and a removable section 23 provided with a lip 24 which extends through a slot in the casing and this door and removable section are located respectively adjacent the rewinding roll 20 and the roll of paper, the free ends of said parts being provided with slots through which a staple 25 on the casing projects, thereby enabling the door and removable section to be locked to prevent the strip of paper from being tampered with. The support 21 for the rewinding roll 20 carries a leaf-spring 26 which bears against the door 22 when it is closed and thus holds the pinion 27 on the rewinding roll in mesh with the pinion 28 which actuates it, as shown in Fig. 3. When the door and the removable section are opened the roll of paper and the rewinding roll can be moved into the positions shown in dotted lines in Fig. 3, the lower edge of the door opening in the casing being provided with saw teeth, as shown in Fig. 2, to enable the strip of paper to be drawn against the same when it is desired to sever the strip.

The primary actuating mechanism of the machine is shown in Fig. 4, said mechanism being located between the back plate and the base plate and comprising a rocking member 29 mounted on a stud 30 on the back plate and provided at its upper end with an opening 31 which receives a pin 32 that projects rearwardly from a rock arm 33 fixed to a cam shaft 34 shown in Fig. 7. The rock arm is located in the space between the back plate and the base plate and a stop screw 35 on the base plate enters a slot 36 in said rock arm for controlling its limits of movement. The rocking member 29 is actuated by means of levers 37 and 38 pivotally mounted on the back plate and provided at their lower ends with rollers 39 and 40 which engage the rocking member and actuate it whenever one of the levers is operated, the lever 37 moving the rocking member to the left to cause a cash fare to be registered and the lever 38 moving the rocking member to the right to cause a transfer fare to be registered. Cords or ropes 41 and 42 are connected to the upper ends of said levers for operating them and stationary stops 43 are provided for governing the positions of the lever, a spring 44 which is connected at its opposite ends to the levers restoring them to normal position after they have been operated. The rocking member 29 is held in its normal position midway between the lower ends of the levers 37 and 38 by means of links 45 connected thereto and to the levers, said links having elongated slots through which the studs 46 extend that connect the links to the levers.

The cam shaft 34 which is in the form of a sleeve is mounted on a fixed stud located at the lower end of the machine, and said shaft carries a plurality of cams 48, 49 and 50, which actuate the levers that impart movement to the recording mechanism and also the mechanism which indicates on the faces of the register the number of fares which have been rung up, each of said cams being provided with a roll or rolls which contact with the lever which the cam actuates, see Fig. 7. Three of these levers 51, 52 and 53, are provided and are all pivoted on a stud 54 as shown in Fig. 6, and for convenience I have termed them respectively, the "transfer" lever, the "disks" lever, and the "cash" lever. Rack bars 55, 56 and 57 are connected to these actuating levers and co-operate with ratchets 58, 59 and 60 so that whenever one of the levers is actuated the ratchet which co-operates therewith will be rotated one step forwardly, retrograde movement of said ratchets being prevented by means of spring-actuated detaining pawls 61. For returning the levers and their connected rack bars to normal position a spring-actuated bell crank lever 62 is provided which carries pins 63 that rest upon the upper edges of the levers. The rack bar 56 of the disk lever carries pins 64 which engage portions of the rack bars 55 and 57, and a spring 65, which is connected to one of the pins, holds all of said rack bars normally in engagement with a fixed stop 66 so that said rack bars will be in position to engage their respective ratchets whenever the levers to which they are connected are actuated, the cam 49 which actuates the disk lever being so formed that it will operate said lever whenever the cam shaft 34 is rocked in either direction. The ratchet 60 that is actuated by the cash lever rack bar 57 is pinned to the main shaft 69 of the machine, as shown in Fig. 7, and a gear 70 is also rigidly connected to said main shaft. A sleeve 71 to which the disks ratchet 59 is connected surrounds the main shaft and a gear 72 is connected to said sleeve, the transfer ratchet 58 being loosely mounted on this sleeve and having a gear 73 rigidly connected thereto.

The cash gear 70 and transfer gear 73, just referred to, actuate the printing mechanism which the machine is provided with for indicating on the strip of paper the condition of the register or the number of fares which have been rung up. The printing mechanism referred to is of well-known construction and, as shown in Fig. 8, consists of two totalizers 74 and 75, each of which consists of a bank of wheels carrying printing type on their peripheries, the wheels of the totalizer 75 being mounted on a shaft having a gear 76 fixed thereto which meshes with the transfer gear 73, and the wheels of the totalizer 74 being mounted on a sleeve 77 having a gear 78ª connected thereto which meshes with the cash gear 70. The first wheels of the totalizers are fixed to the shaft or sleeve by which they are carried while the other wheels which constitute the totalizers are loosely mounted, and are actuated intermittently by means of pinions 74ª and 75ª, as shown in Fig. 8, but as this mechanism for operating the loosely mounted wheels of the totalizers is of well-known construction a detailed description of same is not deemed necessary. Suffice it to say that one complete revolution of the first wheel of each totalizer imparts movement to the next wheel of higher order one-tenth of a revolution and so on throughout the series of wheels. I have provided means for keeping the printing type on the totalizer wheels in alinement, and referring to Figs. 8 and 12 it will be seen that the pinions 74ª and 75ª are each cut away to form three straight faces 71ᵇ. Co-operating with said pinions are dogs 80ª which at certain periods are moved into engagement with one of the straight faces 71ᵇ of the pinions so that in case the printing type on the totalizer wheels are not in alinement, these dogs co-operating with the straight faces on the pinions will cause the totalizer wheels to be rotated slightly and thus bring the type on the different wheels in alinement.

For indicating that a fare has been "rung up," or registered, two bells 78 and 78' are provided, the bell 78' indicating that a cash fare has been registered and the bell 78 indicating that a transfer fare has been registered. The bells are nested together and are mounted on a stud 79 and hammers 80 and 80' are employed for striking these bells. The construction and operation of these hammers is the same so that I will describe only one hammer, namely, that which strikes the transfer bell, the other hammer and its operating mechanism being designated by the same reference character with the prime mark added. The hammer 80 is pivotally connected at 81 to a lever 82 which is pivoted at 83 and the lower end of said lever has a tooth 84 which co-operates with the transfer ratchet 58, as shown in Fig. 6, the upper end of the lever 82 bearing normally against a fixed stud 85. A spring 86 which is connected at one end to a stationary stud 87 is fastened at its opposite end to an arm 88 on the hammer 80 and operates to hold a tail 87' on said hammer in engagement with a stud 88' on the lever 82. Whenever the transfer ratchet is actuated the lever 82 will be swung on its pivot to carry the hammer away from the bell and as the tooth on the lower end of the lever 82 drops down into the next tooth of the transfer ratchet the lever 82 will be returned quickly to normal position by means of the spring 86. As said lever comes against the fixed stop 85 with great force, the hammer which, as previously stated, is pivotally connected to said lever, will be thrown forwardly and strike the bell, thus indicating that a transfer fare has been rung up, the bell 78' being struck by its hammer whenever a cash fare is rung up.

It is also desirable that some means be provided for indicating to the conductor the number of fares which he rings up, and to this end the face plate of the machine is provided with an opening in which numbers are displayed to indicate the number of fares rung up on each trip. The means for indicating the number of fares on each trip consists of two disks 89 and 90 provided with numbers from 1 to 9 and a zero, which disks co-operate to indicate fares up to 99 and a plate 100 carrying the number 1 and a zero co-operates with said disks to indicate fares up to 199. The disk 89 is carried by a sleeve which has fixed thereto a gear 101 which meshes with an idler 102 in mesh with the disks gear 72, as shown in Fig. 7, but as the construction and operation of the disks 89 and 90 and the plate 100 is substantially the same as that described in Patent No. 683,471 previously referred to, a detailed description of same is not deemed necessary. Means is also provided for indicating through an opening in the face plate the kind or class of fares registered and, of course, any mechanism to accomplish this must be controlled and actuated by the devices which register and record the different kinds of fares. To this end, a plate 103 is provided, having printed thereon the words "Cash" and "Transfers," said plate being carried by a bar 104 having a slot 105 through which a stationary guide screw 106 projects, and fastened to the lower end of said bar is an arm 107 fixed to a rock shaft 108, as shown in Fig. 11. Said rock shaft is provided with a second arm 109, shown in dotted lines, and the cam shaft 34 is provided with a disk 110 having pins 111 and 112. When the cam shaft is oscillated, as for example, by pulling on the cash cord 41, the pin 111 will engage the arm 109 and rock it downwardly to bring the word "Cash" on the plate 103 into alinement with the opening in the face plate of the register. When the cam shaft is oscillated in the other direction, as for example, by pulling on the transfer cord 42, the pin 112 of the disk 110 will engage the arm 109 and rock it upwardly to bring the word "Transfer" into alinement with the opening in the face plate, the plate 103 being retained in its elevated position by means of a locking dog 113 which engages the rounded end of the arm 107. The disk 110 also performs another function, namely, locks the cam shaft in case a partial movement in either direction is imparted thereto, as for example, in case the conductor should start to ring up a fare and then discontinue before completing the operation. This locking of the cam shaft is accomplished by providing the disk 110 with two sets of teeth 116 and 117 with which a spring-actuated locking dog 118 co-operates. Said disk also has three notches 119 and the locking dog normally extends into the central notch, as shown in Fig. 6. When the cam shaft is oscillated the dog 118 will ride over said teeth and if the shaft has a full movement imparted thereto one of the end notches 119 will be brought into position so that the locking dog can extend thereinto. If, however, a full movement is not imparted to the cam shaft said dog will engage said teeth and securely lock the disk 110 and cam shaft from moving in the reverse direction and the only way in which the cam shaft can be released is by completing the movement of the cam shaft so that one of the end notches 119 will register with the locking dog 118 which can then reverse itself.

120 indicates what is known as the resetting shaft which projects through the casing of the machine and carries a winged head on its outer end which bears the word "Set" and an arrow to indicate the direction in which the resetting shaft is to be turned to restore the parts to normal position. In the machine herein shown, it is necessary to make one complete revolution of the resetting shaft to accomplish this. This shaft carries a cam 121 provided in its lower side with a recess 122 which receives a pin 123 carried by a sliding plate 124 when said plate is in its normal elevated position. This plate is guided to move longitudinally of the shaft 120 and carries a pawl 125 for actuating the paper-feeding mechanism, as hereinafter described. The other side face of the cam is provided with a recess which, when the parts are in normal position, receives a roll 126 carried by a vertically movable frame 127. This frame carries the indicator disks 89 and 90 and their operating mechanism. As the shaft 120 is rotated the cam face thereon engages the roll 126 on the frame 127 and raises said frame, thereby releasing the indicator disks, as clearly described in the patent referred to, and permitting the spring-pressed sectors 128 to restore the disks to their starting position. These sectors, when the indicating disks are operated, are moved to a position to store up power in their respective actuating springs 129, the continued movement of the indicating disks causing the sectors to ride over the pinions 130 connected to the disks, and said sectors being then in a position to return the indicating disks to zero the instant the frame 127 is elevated and the disks released. For holding the sector 128 of disk 89 out of engagement with the teeth of its co-operating pinions 130 after said sector has been moved into position preparatory to returning the disk 89 to normal position, as shown in dotted lines in Fig. 5, a dog 131 is provided which engages the end 132 of said sector and thus holds it out of contact with said pinion so that a further movement of the pinion will not cause the last tooth of the sector to drag over the teeth of the pinion and cause a breakage or wearing away of parts. The dog 131 is mounted on a fixed stud 133 and is provided with an arm 134 which extends into the path of movement of a stud 135 carried by the slide plate 124 so that when said plate is depressed by turning the resetting shaft said dog will be actuated to release the sector, the dog being returned to normal position by means of a spring 136.

A trip indicator 137 is also provided but as the construction and operation of said indicator is substantially the same as that shown in the patent referred to a detailed description of same is not deemed necessary.

The strip of paper is fed through the machine by means of rolls 140 and 141, the roll 140 being provided with a ratchet 142 which is actuated by the pawl 125 carried by the plate 124 which is depressed when the resetting shaft is operated. Said roll 140 also carries a pinion 144 which meshes with the idler 28 in mesh with the pinion 27 carried by the rewinding roll so that said rewinding roll will be operated simultaneously with the feeding roll 140. The feed roll 141 which is located underneath the strip of paper, as shown in Fig. 12, is journaled in arms 145 projecting upwardly from a pivotally mounted plate 146 which hereinafter will be more fully described.

It is also desirable that some means be provided for indicating the total number of cash fares and transfer fares which have been registered and to this end the face plate is provided with a plurality of openings 149 and a plurality of openings 150 in which numbers are displayed which indicate respectively the total number of cash fares and transfer fares, as shown in Fig. 1. The numbers which indicate the cash fares are formed on a plurality of disks 151, 152, 153 and 154, as shown in Fig. 11, each disk being provided with numbers from 1 to 9 and a zero. Said disks are fixed to stud shafts 155, 156, 157 and 158, carried by a stationary plate 159 and each stud shaft is provided with a gear designated by the same reference character as its stud shaft with the prime mark added and with a disk having a single tooth as shown in Fig. 11.

The main shaft 69 of the machine, which it will be remembered has the cash ratchet 60 rigidly connected thereto, is provided at its front end with a gear 160, as shown in dotted lines in Fig. 11, and this gear meshes with the gear 155' of the stud shaft 155. Accordingly, each time the main shaft is actuated to register a cash fare the disk 151 fixed to the stud shaft 155 will be rotated one step forward to bring a different number into alinement with the first one of the sight-openings 149 in the face plate. As the disk 151 is only provided with numbers from 1 to 9 and a zero this disk of itself will indicate the registration of only nine fares and as the tenth fare is rung up the zero on said disk will be brought into alinement with the opening in the face plate. While the disk 151 has been rotating the disk 152 adjacent thereto has remained at rest but as the tenth fare is registered the single tooth which rotates with the disk 151 will engage one of the teeth of the gear 156' of the adjacent disk 152 and actuate the same to bring the numeral 1 on said disk into alinement with the second one of the sight-openings 149 and thus indicate the registration of ten cash fares. The numeral 1 remains in this position while the disk 151 is completing a revolution to indicate the registration of nineteen fares and as the twentieth fare is rung up the single tooth which moves with the disk 151 again comes into engagement with the gear of disk 152 and actuates the same one step forwardly to bring the numeral 2 of said disk into alinement with the second sight-opening. The operation of the other disks is the same as that of the disks 151 and 152; that is to say, the disk 153 is rotated one step forwardly every time the disk 152 makes a complete revolution and the disk 154 rotates one step forwardly every time the disk 153 makes a complete revolution. For holding the disks 151 to 154 at rest so that their numerals will register exactly with the sight-openings in the face plate, spring-actuated pawls 161 are provided for co-operating with the gears of said disks.

The construction and operation of the mechanism which indicates the registration of the transfer fares is substantially the same as that just described for indicating the registration of the cash fares except that only three disks, 162, 163 and 164, are employed. This transfer indicating mechanism, of course, is actuated simultaneously with the actuation of the transfer totalizer 75 which prints the condition of the register on the strip of paper and, as shown in Fig. 8, the shaft which carries the transfer totalizer wheels is provided at its front end with a gear 165 which meshes with an idler 166 in mesh with the gear of the disk 162.

For enabling the type on the peripheries of the adding wheels which constitute the totalizers 74 and 75 to make a permanent ink impression on the strip of paper, an inking ribbon 167 is employed. The spool 168 on which the inking ribbon is wound is carried by a shaft 169 which projects outwardly from a stationary plate, as shown in Fig. 12, and a spool 170 of similar construction is provided for receiving the inking ribbon as it is unwound from the spool 168. The inking ribbon is led from the spool 168 under a guide roller 171 over the upper face of the strip of paper which rests on a pivotally mounted plate 172, thence around a roll 173 and back underneath a roll 174 to the rewinding spool 170. A platen 175 is mounted above the plate 172 and the inking ribbon and strip of paper pass between this platen and the plate 172. Said platen is carried by a rod 176 which projects upwardly through lugs on a bearing 177 and is provided with a cross pin 178 which normally engages the upper lug of the bearing. The rod is also provided with a second cross pin 179, and a coiled expansion spring 180 surrounds the rod between the pin 179 and the upper lug of the bearing, as shown clearly in Fig. 12, the force of said spring tending to force the platen downwardly. Preferably, and as herein shown, the bearing 177 is adjustably mounted, thereby enabling the position of the platen to be varied, said bearing being provided with elongated slots through which screws 181 extend for clamping the bearing to the plate.

The spools on which the inking ribbon is wound are of novel construction as well as the mechanism employed for actuating said spools. One of the spools is shown in section in Fig. 10 and referring to said figure it will be seen that the shaft 169 on which the spool is mounted is provided with a slot 183 in which a spring 184 is located. Said spring bears against the inside of the hub or barrel of the spool and thus prevents the spool from turning too freely on its shaft. The force with which the spring engages the hub of the spool can be varied by turning a screw, threaded plug 185 in which one end of the spring is seated, the shaft 169 being also provided with a cap screw 186, the head or flange of which is of greater diameter than the shaft and thus prevents the spool from moving endwise of the shaft when said cap screw is in operative position.

A ratchet 187 is fastened to one flange of each spool and the mechanism for actuating said spools consists of a sliding plate 188 provided with pawls 189 and 190 which co-operate with the respective ratchets of the two spools. The right hand end of said sliding plate (looking at Fig. 12) is connected to a rock arm 191 provided with an arm 192 which extends under the stud or roll 135 on the plate 124 which is depressed whenever the resetting shaft is operated. Accordingly, each time the resetting shaft is operated the lever 191 will be rocked and the slide plate 188 will be actuated to cause the pawl thereon which is then in engagement with its co-operating ratchet to impart a slight rotary movement to the spool and thus carry a different section of the inking ribbon into alinement with the type of the totalizer wheels, the slide plate being returned to starting position by means of a spring 193. The alining dogs 80ᵃ of the totalizer printing mechanism are connected to the shaft to which the arm 192 is fastened so that each time the resetting shaft is operated, these alining dogs will be moved into engagement with their co-operating pinions.

It is desirable that the direction in which the inking ribbon is fed should be reversed after most of the ribbon has been wound from the spool 168 onto the spool 170 and to this end the pawls on the slide plate 188 are constructed in the following manner: Referring to Fig. 12 it will be seen that the pawl 190 is in engagement with its co-operating ratchet. This pawl 190 is provided at its outer end with a lug 194 through which a spring 195 extends that is fastened at its other end to a rock stud or shaft 196 journaled in the slide plate 188 and the tendency of said spring is to hold the pawl 190 in engagement with its ratchet, the rock shaft 196 being provided with a projecting pin 197 that co-operates with inverted V-shaped teeth 198 and 199 formed in a locking dog 200 pivoted to the slide plate and actuated by a coiled spring 201 whereby the rocking stud 196 is held in either of two positions. The pawl 190 is provided with a pin 202 which extends through an elongated slot in one end of the pawl 189. A device 203 of approximately bell crank shape is adjustably connected to a sleeve 204 which is oscillatingly mounted on a fixed stud 204', the end of which projects through an elongated slot 205 in the slide plate 188 and rollers 206 and 207 are mounted in the opposite ends of said device 203 for bearing respectively on the inking ribbon wound on the spools 168 and 170. A pointed pin 208 projects upwardly from the sleeve 204 and co-operates with inverted V-shaped notches 209 and 210 formed in a pivotally mounted locking dog 211 which is forced downwardly by a spring 212 and thus holds the device 203 in either of two positions. The sleeve 204 is provided with a laterally extending arm 213, shown in dotted lines in Fig. 12, which has two contact lugs, and projecting between these contact lugs is an arm 214 fastened to the rocking stud 196. When the pin on the rocking stud 196 is in engagement with the notch 198 of the locking dog 200, the pawl 190 will be held in position to engage and actuate the ratchet of spool 170 each time the slide plate is moved forwardly. When a certain amount of the inking ribbon has been wound on the spool 170, the roll 207 in the end of the device 203 will bear on said ribbon and as said spool continues to fill the device 203 will be rocked, thereby causing its pointed pin 208 to ride out of the notch 210 in the locking dog 211 and pass into the notch 209 in said dog and as the side walls of said notch are inclined a quick movement will be imparted to the device 203 which causes the lower lug on the arm 213, carried by the sleeve 204 to which the device 203 is connected, to engage the arm 214 fixed to the rock stud 196 and rock it upwardly, thereby causing the spring 195 to be elevated and thus move the pawl 190 into an inoperative position with respect to the ratchet which it operates, the pin on the rock stud 196 sliding into the other notch 199 of the locking dog 200 and thus holding the pawl 190 inoperative. As the pawl 190 moves out of engagement with its ratchet, the pin on said pawl co-operating with the slot in the pawl 189, moves said pawl 189 into operative position so that it will engage and actuate the ratchet of the spool 168, each time the slide plate 188 moves forwardly. This pawl 189 is moved into an inoperative position and the pawl 190 moved into an operative position when the spool 168 becomes filled with the ribbon, in the same manner as described with reference to pawl 190 as the device 203 is provided with a roll 206 which engages the ribbon that is wound onto the spool 168.

From the foregoing description it will be seen that I have constructed a ribbon feeding mechanism which is entirely automatic in its operation and causes the ribbon to be fed from one spool to another as the spools become filled.

As stated in the first part of the specification, the conductor when he assumes charge of the car is supposed to insert a stamp in the machine, which stamp prints on the strip a character or number designating that particular conductor. The conductor is also required to insert an operating handle which causes the machine to become operative and also prints on the strip the condition of the register at that time, namely, the number of cash fares and transfer fares which have been registered.

Referring to Fig. 12 it will be seen that a device 220 is located at the bottom of the register. This device, which is in the form of a cylinder, is rotatably mounted on a hollow shaft 221 supported by stationary bearings 222 and 223, said shaft being provided with a slot consisting of a straight portion 224 extending circumferentially of the shaft, a straight portion 225 extending longitudinally of the shaft at right angles to the portion 224, an inclined portion 226 and a straight portion 227 extending to the lower end of the shaft, as shown in Fig. 15, which is a development of this shaft.

In Fig. 14 which is a development of the cylindrical device 220, it will be seen that a longitudinally extending slot 228 is formed on the inner wall thereof, indicated by dotted lines in said figure, and that the periphery of said cylindrical device is provided with a diamond-shaped cam block 229 and a circumferentially extending cam slot 230 of irregular shape. Said device 220 also carries a pin 231 at its upper end, teeth 232 and grooves 233 at its lower end and notches 234 and 235 adjacent its lower end. The irregular-shaped cam groove 230 of the device 220 receives a roller 236 on a lever 237 pivoted on a stud 238, as shown in Fig. 12, and a spring-actuated pawl 239 is mounted in the free end of said lever for co-operating with a ratchet 240 fixed to the feed roll 141 of the paper strip feeding mechanism, said lever being forced normally downward to carry its pawl away from the ratchet 240 by means of a spring 241 connected to said lever and to a stationary stud. The function of this lever 237 and its pawl is to feed the paper strip forwardly for a short distance whenever the conductor inserts his stamp or the operating handle in the hollow shaft 221 on which the device 220 is mounted. The function of the lower cam faces 242 on the diamond-shaped cam block 229 is to actuate mechanism for causing the total number of fares registered to be printed on the strip of paper whenever the operating handle is inserted or withdrawn, and the function of the upper cam face 243 of the diamond-shaped cam block is to actuate mechanism for causing the number of the register to be printed on the strip of paper.

The mechanism which produces the printing of the total number of fares whenever the operating handle is inserted or withdrawn is clearly shown in Fig. 12 and consists of a block 245 pivoted at 246 and located beneath the plate 172 on which the strip of paper travels so as to engage said plate and move it upwardly to force the inking ribbon and strip of paper into engagement with the type of the totalizer wheels whenever said block 245 is actuated. A lever 247 is pivotally connected to the block 245 and is provided with an adjustable contact screw 248 which engages a portion of the block 245, thereby enabling the position of the block relatively to its actuating lever 247 to be changed and thus vary the pressure with which the inking ribbon and strip of paper are forced against the type of the totalizer wheels. An inclined face 249 on the lever 247 rests on a roller 250 carried by one of the arms of a bell crank lever 251 and the other arm of said bell crank lever is provided with a roll which co-operates with the lower cam faces 242 of the diamond-shaped cam block on the device 220. Accordingly, whenever the cylindrical device 220 is rotated a sufficient distance to cause the cam face 242 thereon to actuate the bell crank lever 251 the plate 172 will be moved upwardly to cause the condition of the register to be printed on the strip of paper. A block 252 provided with a numeral or character designating this particular register is reciprocatingly mounted in stationary guideways 253 and extends through an opening in the plate 172 on which the paper strip travels. Said block is held normally depressed by a leaf-spring 253ª which engages a pin 254 on the block 252 and the lower end of said block is adapted to be engaged and moved upwardly by an adjustable screw 255 carried by a lever 256 which is pivoted at 257 and provided at its other end with a roll 258 that is engaged by the upper cam faces 243 of the diamond-shaped cam block whenever the cylindrical device is rotated a sufficient distance.

A spring-actuated locking dog 259 co-operates with the teeth 232 and notches 233 at the lower end of the cylindrical device 220, and the function of this dog is substantially the same as that of the dog which co-operates with the teeth in the disk 110 on the end of the cam shaft 34, namely, to compel a complete movement of the device 220 after it has been started. The function which the notch 235 in the cylindrical device 220 performs is to enable the roll 141 of the paper feeding mechanism to be moved out of engagement with the co-operating feed roll 140 when the machine is not in use, that is when the operating handle or stamp are not in position so that a portion of the strip of paper can be drawn out and severed. To this end the plate 146 which carries the feed roll 141, is provided with arms 260 that are journaled on a stud 261, said plate having connected to the underneath face thereof, an extension 147 of a depending arm 262 provided with a roller 263 which enters the notch 235 of the device 220 when the operating handle or stamp are not in position, thereby permitting the plate 146 to rock on the stud 261 and carry the roll 141 away from the roll 140. For enabling the position of said arm 262 to be changed relatively to the plate 146 and thus vary the tension between the rolls 140 and 141, the face of the extension 147 which contacts with the underneath face of the plate 146 is beveled in opposite directions, as shown in Fig. 12, and bolts 148 are provided for connecting said extension to the plate 146. When movement is imparted to the cylindrical device 220, however, the notch 235 will be carried out of alinement with the roller 263 which then rides on the outer face of the device 220 and forces the feed roll 141 into intimate engagement with the upper feed roll 140. Preferably, the peripheries of these feed rolls 140 and 141 are milled and when in operative position they are so close together that they will form a corrugated impression through the center of the strip of paper to separate the cash fare numbers printed thereon from the transfer fare numbers.

A cover plate 264 is pivotally connected at 265 to the upper bearing 222 in which the upper end of the shaft 221 for the cylindrical device 220 is mounted and this plate 264 normally covers the upper end of said hollow shaft. The cover plate is provided with a pin 266 which projects into the path of movement of the pin 231 at the upper end of the cylindrical device 220 and when the machine is inoperative, namely, when the operating handle is not in place, the pin 231 will engage the pin on the cover plate and hold said cover plate over the end of the hollow shaft 221. When rotary movement is imparted to the cylindrical device 220 the pin thereon will move out of engagement with the pin of the cover plate and said cover plate will then be moved to uncover the end of the hollow shaft by means of a spring 267. The purpose of providing the device 220 with a notch 234 is to afford a clearance for the locking device 268 which is employed for locking the cam shaft 34 when the operating handle is not in the machine, said locking device being shown in Figs. 6 and 13. Said locking device is pivoted at 269 to a stationary part of the machine and has a roll 270 which enters the notch 234 in the cylindrical device 220 after it has been rotated a certain distance and thus releases the cam shaft 34 to cause the machine to become operative, the locking device being moved by a spring 271. The locking device 268 has a tooth 272 which engages a notch 273 formed in the disk 110 fastened to the cam shaft 34 and is also provided with a second tooth 274 which engages a notch 275 formed in a plate 276 carried by the cam shaft 34, thus securely locking the cam shaft when the roll on said locking device engages the periphery of the cylindrical device 220. As previously stated, however, whenever the roll of said locking device enters the notch 234 in the cylindrical device, the teeth of the locking device 268 will move out of the notches in said disk plate and thus unlock the cam shaft 34. The frame 127 is locked in its depressed position by means of a lever 277 provided with a tooth 277ª which engages a notch 278ª in said frame, as shown in Fig. 6. This lever is actuated to release the frame 127 by means of the plate 124 which is depressed when the resetting shaft is rotated, said plate having an inclined face 280ª which co-operates with a pin on the lever 277. As an additional locking means for preventing the resetting shaft from being rotated when the stamp or operating handle are not in position, the lever 277 is provided with an extension 278 which is located in alinement with the notch 275 in the plate 276 so that when the tooth 274 of the locking dog 268 is in this notch it will be impossible for the lever 277 to be moved as there is no clearance for its extension 278, and accordingly the resetting shaft cannot be turned.

The device 280 which I have designated as the "conductor's stamp" is shown in Fig. 16, and the device 281 which I have designated as the "operating handle" is shown in Fig. 17. The conductor's stamp comprises a round rod of the same diameter as the interior of the hollow shaft 221 on which the cylindrical device 220 is mounted and at the end of said rod is a character or number 282 which designates the conductor who has possession of the stamp. The rod is provided with two laterally extending pins 283 and 284 and with a winged handle 285. The operating handle is of substantially the same form as the conductor's stamp except that it is of less length, has only one laterally extending pin 286, and is not provided with a character or number in its end.

In operation, when the conductor enters the car to start on his trip he inserts his stamp 280 in the hollow shaft 221 with the laterally extending pin 283 projecting into the straight portion 227 of the slot in said shaft, said pin also extending into the groove 228 formed on the inner wall of the cylindrical device 220. The stamp is then pushed upwardly and as its pin 283 engages the inclined portion 226 of the slot in the shaft a slight rotary movement will be imparted to said stamp and also to the cylindrical device 220, due to the fact that the pin extends into the slot in the interior of said device. When the pin 283 reaches the straight portion 225 of the slot in the hollow shaft no further rotary movement will be imparted to the stamp or to the device 220, and the stamp 280 can then be forced upwardly far enough to cause its end to project through an opening in the plate 172 and engage the strip of paper which it forces against the inking ribbon and platen to cause the number on the end of the stamp to be printed on the strip of paper. Although the pin 283 on the stamp is in alinement with the circumferentially extending portion 224 of the slot in the hollow shaft, it will be impossible to rotate said stamp as the pin 284 thereon is then in engagement with the straight portion 227 of the slot in the shaft thereby preventing the strip of paper from being torn as would be apt to occur if the stamp was turned while it was pressed against the paper. The slight movement which was imparted to the cylindrical device as the conductor's stamp was inserted caused the strip of paper to be fed forwardly for a short distance due to the fact that the lever 237 was actuated by the cam groove 230 and the cover plate was moved from over the end of the hollow shaft so that the conductor's stamp could pass up through the plate 172. The conductor's stamp is then withdrawn and this operation restores the device 220 to normal position. The operating handle 281 is then inserted in the hollow shaft 221 with its pin 286 projecting into the groove on the inner face of the cylindrical device 220 and the act of forcing the operating handle upwardly causes the device 220 to be rotated forwardly so that the lever 237 is again actuated to feed the paper strip forwardly for a short distance. When the pin 286 on the operating handle comes into alinement with the circumferentially extending portion 224 of the slot in the shaft 221 the operating handle can be turned until it reaches the end of the circumferentially extending slot, this movement of the operating handle causing the cylindrical device 220 to be rotated far enough to cause its cam surfaces 242 and 243 to pass by and actuate the levers 251 and 256 and thus cause the number of the machine to be printed on the strip and also the total number of cash fares and transfer fares which have been previously registered. The notch 234 on the device 220 has also been brought into position to enable the roll on the locking device 268 to enter therein so that the cam shaft 34 will be unlocked and the machine can now be operated for registering fares, the device 220 being retained in the position to which it has been moved by a spring-pressed plunger 288 which engages a notch in the bearing 222, as shown in Fig. 7, said spring-pressed plunger also holding the device 220 in proper position so that its groove 228 alines with the portion 227 of the slot in the shaft 221 when the stamp or operating handle are not in position. The operating handle is left in the machine during the time the conductor has charge of the car and when he leaves the car he turns the operating handle in the reverse direction and withdraws it from the hollow shaft 221, the return movement of the device 220 actuating all of the parts which it actuated in its forward movement and thus causing the total number of fares and the number of the register to be printed on the strip, and also feed the paper forwardly. He also inserts his stamp again to print his number on the strip, thus inclosing the numbers on the strip which indicate the condition of the register for the time he had charge of it and for which he will be held responsible.

Referring back to the resetting shaft, the frame 127 which this resetting shaft moves upwardly, is provided with an adjustable contact screw 289, shown in Fig. 6, and also in dotted lines in Fig. 12, and this screw is adapted to engage the lever 247 connected to the block 245 and rock the same upwardly whenever the frame is raised by the rotation of the resetting shaft, thereby causing both of the totalizers 74 and 75 to print on the strip the condition of the machine at the end of a trip which, as previously stated, is the time at which the conductor rotates the resetting shaft.

In Fig. 20 I have shown a portion of the strip of paper which has been fed through the machine, and referring to said figure it will be seen that the strip has printed thereon the number 14 which is the number of this particular register, the numbers 1,350 indicating the total number of cash fares and the numbers 175 indicating the total number of transfer fares which had been rung up together with the numeral 10 which designates the conductor who last had charge of this car. The next conductor who took charge of the car inserted his stamp and printed his number (80) on the strip and then inserted the operating handle to cause the machine to become operative, the act of inserting the operating handle causing the numbers 1,350 and 175 to be printed on the strip and also the number 14 of the register. On the first half of the trip; i. e., from the car station down town, this conductor rang up fifty cash fares and twentyfive transfer fares and then operated the resetting shaft when the return trip was commenced. The act of turning the resetting shaft, caused the numbers 1400 and 200 to be printed on the strip, thus indicating the total number of cash and transfer fares which had been registered up to that time. On the return trip thirtyfive cash fares and fifteen transfer fares were rung up, and if the conductor turns the car over to another conductor at the end of the return trip, he withdraws the operating handle which causes the number of the register and the total number of fares registered, which would be 1435 cash and 215 transfer fares, to be printed on the strip. He also inserts his stamp again to cause his number 80 to be printed on the strip so that the numbers indicating the condition of the register for the time he had charge of the car, and for which he is responsible, will be confined between the two numbers 80. The auditor who compares the strip with the cash and transfers turned in by the conductor can tell instantly by subtracting the number 1350 from the number 1435 and the number 175 from the number 215 that the conductor should have turned in eightyfive cash fares and forty transfers.

I have not herein claimed the primary actuating mechanism of the register as I intend to file a separate application covering said mechanism.

Having thus described the invention, what is claimed as new and desired to be secured by Letters Patent is:

1. In a register, a totalizer for registering the number of operations of the register, a strip for receiving impressions from the totalizer, feeding mechanism for said strip, and a removable identification stamp which is adapted to be inserted in the register to cause said feeding mechanism to be operated and manually forced into engagement with said strip to impress a mark thereon; substantially as described.

2. In a register, a totalizer for registering the number of operations of the register, a strip for receiving impressions from the totalizer, feeding mechanism for said strip, and a removable stamp provided at its end with an identification character which is adapted to engage said strip and impress the same in the act of inserting the stamp in the register, said stamp also causing said feeding mechanism to be actuated as it is inserted in the register; substantially as described.

3. In a register, a totalizer for registering the number of operations of the register, a strip for receiving impressions from the totalizer, feeding mechanism for said strip, a removable stamp provided at its end with an identification character which is adapted to engage said strip and impress the same in the act of inserting the stamp in the register, the movement of said stamp also causing the feeding mechanism to be actuated, and means for preventing said stamp from rotating after its character has engaged said strip; substantially as described.

4. In a register provided with means for recording the operations of the register, a record strip, feeding mechanism for said strip, a member over which said strip travels, said member being provided with an opening, a platen arranged above said strip, and a removable identification stamp which is adapted to be inserted in the register and rotated to cause said feeding mechanism to be actuated and thereafter forced through the opening in said member to engage the record strip and impress a mark thereon; substantially as described.

5. In a register provided with means for recording the operations of the register, a record strip, feeding mechanism for said strip, a platen, an inking ribbon interposed between said strip and platen, and a removable stamp provided with an identification character which is adapted to be forced into engagement with the record strip to make an impression thereon in the act of inserting the stamp in the register, the movement of the stamp as it is inserted in the register also causing the feeding mechanism to be actuated; substantially as described.

6. In a register, a totalizer, means for actuating said totalizer to record the operations of the register, mechanism for locking said means, a record strip for receiving an impression from said totalizer, and a removable operating handle which is adapted to be inserted in the register and thereafter rotated for causing said locking means to become inoperative and also cause the totalizer to make an impression on said strip; substantially as described.

7. In a register, a totalizer, mechanism for actuating same, means for locking said mechanism, a strip for receiving impressions from said totalizer, feeding mechanism for said strip, and a removable operating handle which upon being inserted in the register, releases said locking means, forces the strip into engagement with the totalizer to make an impression on said strip and also cause said strip to be fed; substantially as described.

8. In a register, a totalizer, means for actuating the same, means for rendering said actuating means inoperative, a record strip for receiving impressions from said totalizer, and a removable operating handle adapted to be inserted in the register and rotated for causing the totalizer-actuating mechanism to become operative, and also cause said totalizer to make an impression on the record strip; substantially as described.

9. In a register, a plurality of type-carrying wheels constituting a totalizer, means for actuating said wheels, means for rendering said wheels inoperative, a record strip, a removable identification stamp that is adapted to be inserted in the register and manually forced into engagement with said strip to make an impression thereon and thereafter be withdrawn from the register, and a removable operating handle which upon being inserted in the register causes the totalizer-actuating mechanism to become operative, and also causes the totalizer to make an impression on the strip; substantially as described.

10. In a fare register, a totalizer, mechanism for actuating said totalizer, means for rendering said actuating mechanism inoperative, a record strip for receiving impressions from said totalizer, and a removable operating handle which upon being inserted in the register causes the totalizer-actuating mechanism to become operative and also causes the totalizer to make an impression on the strip, said operating handle also causing the totalizer to make a second impression on the strip as said handle is removed; substantially as described.

11. In a register, a record strip, a hollow shaft provided with an elongated slot, a plate covering the end of said shaft, a member rotatably mounted on said shaft and provided with means for engaging said plate, said member being provided on its interior with a groove, and a device adapted to be inserted in the hollow shaft and provided with a pin which enters the groove in said member, whereby said member may be rotated; substantially as described.

12. In a register, a record strip, a hollow shaft provided with an elongated slot, a plate covering the end of said shaft, a member rotatably mounted on said shaft and provided with means for engaging said plate to hold it over the end of the shaft, a device adapted to be inserted in the hollow shaft and provided with means for rotating said member, and a spring for moving the plate from over the end of the shaft; substantially as described.

13. In a register, a record strip, a hollow shaft provided with an inclined slot, a plate covering the end of said shaft, a member rotatably mounted on said shaft and provided with means for engaging said plate, said member being provided on its interior with a groove, and a device adapted to be inserted in said shaft and provided with a pin which extends through the slot in the shaft and enters the groove in said member whereby both said device and said member are rotated as said device is forced into the shaft; substantially as described.

14. In a fare register, a hollow printing member, a record strip arranged adjacent said member, rolls for feeding said strip, a rotatable member provided with cams, devices actuated by the cams for causing the strip to be forced into engagement with the printing member and then fed forwardly, and a removable operating handle adapted to be inserted in said hollow member for actuating same; substantially as described.

15. In a fare register, a totalizer, a record strip, a device for printing a number on the strip, rolls for feeding said strip, a rotatable member provided with cams, levers actuated by the cams for actuating the printing device and for causing the strip to be moved into engagement with the totalizer and fed forwardly, means for locking said rotatable member, and a removable operating handle adapted to be inserted in said member to release said locking means and also actuate said member; substantially as described.

16. In a fare register, a plurality of type-carrying wheels constituting a totalizer, a strip, an inking ribbon arranged between said wheels and said strip, a plate on which the strip travels, a hollow shaft arranged under said plate and provided with a continuous slot, a rotatable member mounted on said shaft and provided with cams, said member having an interior groove, a lever carrying a pawl for actuating said feed roll, a lever for elevating the plate on which the strip travels, said lever being actuated by the cams on said rotatable member, and an operating handle adapted to be inserted in said hollow shaft and provided with a pin which engages the groove in said rotatable member whereby the same may be operated; substantially as described.

17. In a fare register, type-carrying wheels constituting a totalizer, a strip arranged adjacent said totalizer, rolls for feeding said strip, a pivoted plate carrying one of said rolls, an arm adjustably connected to said plate, a member provided with a recess which receives the lower end of said arm when the register is inoperative whereby said rolls are held out of engagement with each other, and an operating handle which upon being inserted causes the register to become operative and also moves said member to force the arm out of the recess therein; substantially as described.

18. In a fare register, a totalizer, an oscillating cam shaft, means for actuating said cam shaft to impart movement to the totalizer, a device for locking said cam shaft, a member for causing said device to remain in engagement with said cam shaft, and a removable operating handle for actuating said member to release said device; substantially as described.

19. In a fare register, a totalizer, a shaft, means for actuating said shaft to impart movement to the totalizer, a device for locking said shaft, a rotatable member having a recess for receiving a portion of said locking device, and a removable operating handle for actuating said rotatable member to permit said locking device to enter said recess and thus cause the register to become operative; substantially as described.

20. In a fare register, a totalizer, a shaft, means for actuating said shaft to impart movement to the totalizer, a device for locking said shaft, a member constructed to receive a portion of said locking device when the register is operative, a resetting shaft, means for preventing said resetting shaft from being turned while the locking device is in engagement with said shaft, and a removable operating handle for actuating said member whereby said locking device is permitted to move from engagement with the shaft; substantially as described.

21. In a fare register, totalizers for registering different classes of fares, means for indicating the total number of fares of all classes which are registered on each trip, means for actuating said totalizers comprising a ratchet for each totalizer and coöperating pawls for said ratchets, means for operating said indicating means comprising a ratchet and a co-operating pawl, and a rock shaft provided with cams for imparting movement to said pawls; substantially as described.

22. In a fare register, disks provided with numerals for indicating the number of fares which have been registered, means for rotating said disks forwardly, pinions fixed to said disks, spring-actuated sectors co-operating with said pinions and adapted to be moved thereby against the tensions of their actuating springs, and a dog co-operating with one of said sectors to hold it out of engagement with its pinion when the disk to which said pinion is fastened has been moved a certain distance; substantially as described.

23. In a fare register, disks provided with numerals for indicating the number of fares which have been registered, means for rotating said disks forwardly, pinions fixed to said disks, spring-actuated sectors co-operating with said pinions and adapted to be moved thereby against the tensions of their actuating springs, a dog co-operating with one of said sectors to hold it out of engagement with its pinion when the disk to which said pinion is fastened has been moved a certain distance, and means for moving said dog out of engagement with said sectors; substantially as described.

24. In a fare register, a totalizer for registering fares comprising a bank of wheels provided on their peripheries with printing type and pinions for transmitting movement from one wheel to the one adjacent thereto in combination with fingers that co-operate with flat surfaces on said pinions to cause the printing type on the wheels to be kept in alinement, and means for actuating said fingers; substantially as described.

25. In a register adapted to record different classes of fares, a member carrying means indicating the different classes of fares, a reciprocating bar upon which said member is mounted, a rock arm connected to said bar, and means for actuating said rock arm to cause said member to be moved into position to display the different fare-indicating means carried thereby; substantially as described.

26. In a register adapted to record different classes of fares, a member carrying means indicating the different classes of fares, a reciprocating bar upon which said member is mounted, a rock arm connected to said bar, and a rocking member co-operating with said rock arm and adapted to be moved in opposite directions when fares of different classes are registered whereby said member will be moved into position to display the indicating means thereon which correspond to the fare that is registered; substantially as described.

27. In a register adapted to record different classes of fares, a member carrying means indicating the different classes of fares, a reciprocating bar upon which said member is mounted, a rock arm connected to said bar for reciprocating it to raise and lower said member, and a locking dog for holding said member in an elevated position; substantially as described.

28. In a register of the class described, a plate adjustably mounted on a stationary support, a platen fastened to a rod which is mounted in bearings in said adjustable plate, and a spring interposed between one of said bearings and a cross pin on the rod; substantially as described.

29. In a register, type-carrying wheels arranged at one side of the register and constituting a totalizer, a plate mounted below said totalizer for supporting a record strip, a supply spool and a rewinding spool for carrying an inking ribbon, a platen arranged between said spools and the totalizer, and rollers for guiding said ribbon from the supply spool under the platen and totalizer and thence in the reverse direction under the totalizer and platen back to the rewinding spool; substantially as described.

30. In a fare register, an approximately cylindrical casing inclosing the operating mechanism of the register, a movable arm arranged inside of the casing adjacent an opening therein and being adapted to carry a roll of paper, a movable arm carrying a rewinding roll and being located inside of the casing adjacent an opening therein, and movable members for closing said openings in the casing; substantially as described.

31. In a fare register, an approximately cylindrical casing inclosing the operating mechanism of the register, a pivotally mounted arm arranged inside of the casing adjacent an opening in one side thereof and being adapted to carry a roll of paper, a pivotally mounted arm carrying a rewinding roll and being located inside of the casing adjacent an opening in the opposite side thereof, a door hinged to the casing and closing one of said openings, and a removable section for closing said other opening, said removable section having a lip which extends into a slot in the casing; substantially as described.

32. In a fare register, a casing inclosing the operating mechanism of the register, a pivotally mounted arm carrying a rewinding roll and being located inside of the casing adjacent an opening therein, means for actuating said rewinding roll, a door for covering the opening in the casing, and a yielding member interposed between said arm and door for holding the rewinding roll in engagement with its actuating mechanism; substantially as described.

33. In a fare register, a base plate, posts projecting from said base plate, a casing arranged on the base plate for inclosing the operating mechanism of the register, said casing being provided with an inwardly projecting flange, a protecting glass engaging said flange, and yielding members carried by said posts for engaging the glass to hold it in contact with the flange of the casing; substantially as described.

34. In a fare register, a base plate, posts projecting from said base plate, a face plate located adjacent the ends of said posts, and means carried by said posts for holding the face plate in position; substantially as described.

35. In a register, a totalizer for registering the number of operations of the register, a strip for receiving impressions from the totalizer, means for feeding said strip, and a removable identification stamp which is adapted to be inserted in the register to impress a mark on said strip and also cause said strip to be fed; substantially as described.

36. In a register, a totalizer, a strip for receiving impressions from said totalizer, feeding mechanism for said strip, and a removable identification stamp which is adapted to be manually forced into engagement with said strip to impress a mark thereon and also cause the feeding mechanism to be actuated; substantially as described.

37. In a register, a totalizer, a strip for receiving impressions from the totalizer, and a removable identification stamp which causes the strip to be fed and have a mark impressed thereon in the act of inserting the stamp in the register; substantially as described.

In testimony whereof, I hereunto affix my signature, in the presence of two witnesses, this 28th day of May 1906.

ADOLPH O. SCHMOLINSKI.

Witnesses:
　WELLS L. CHURCH,
　GEORGE BAKEWELL.